(12) United States Patent
Driehuis

(10) Patent No.: US 12,528,271 B2
(45) Date of Patent: Jan. 20, 2026

(54) MULTI-LAYERED WINDOWPANE AND METHOD FOR PRODUCING SUCH WINDOWPANE

(71) Applicant: AUTOGLAS D & K B.V., Alphen aan den Rijn (NL)

(72) Inventor: Bartholomeus Leonardus Marinus Borcherd Driehuis, Alphen aan den Rijn (NL)

(73) Assignee: AUTOGLAS D & K B.V., Alphen aan den Rijn (NL)

( * ) Notice: Subject to any disclaimer, the term of this patent is extended or adjusted under 35 U.S.C. 154(b) by 385 days.

(21) Appl. No.: 17/799,303

(22) PCT Filed: Feb. 11, 2021

(86) PCT No.: PCT/NL2021/050090
§ 371 (c)(1),
(2) Date: Aug. 12, 2022

(87) PCT Pub. No.: WO2021/162551
PCT Pub. Date: Aug. 19, 2021

(65) Prior Publication Data
US 2023/0158779 A1    May 25, 2023

(30) Foreign Application Priority Data
Feb. 13, 2020    (NL) .................................... 1043567

(51) Int. Cl.
*B32B 17/10* (2006.01)
*B60J 1/00* (2006.01)
*B60J 1/08* (2006.01)

(52) U.S. Cl.
CPC .. *B32B 17/10055* (2013.01); *B32B 17/10302* (2013.01); *B32B 17/1077* (2013.01);
(Continued)

(58) Field of Classification Search
CPC ........ E06B 3/66; E06B 3/6608; E06B 3/6612; E06B 3/6617; E06B 3/663–66371;
(Continued)

(56) References Cited

U.S. PATENT DOCUMENTS 5,244,557 A * 9/1993 Defendini ......... B32B 17/10045
427/126.3
5,593,784 A * 1/1997 Chinzi .............. B32B 17/10055
428/480
(Continued)

FOREIGN PATENT DOCUMENTS

CN    2116609 U     9/1992
CN    1234480 A     11/1999
(Continued)

OTHER PUBLICATIONS

Machine translation of JP 2017/149591 A.*
(Continued)

*Primary Examiner* — Z. Jim Yang
(74) *Attorney, Agent, or Firm* — The Webb Law Firm

(57) ABSTRACT

The invention relates to a multi-layered windowpane including a first transparent outer layer, a second transparent outer layer, and a third, smaller, transparent inner layer that is located in between the outer layers, an adhesive transparent foil layer located between the first outer layer and the third inner layer and a sealing surrounding the third inner layer. The invention also provides a thin layered windowpane core to be incorporated in such a multi-layered windowpane as well as a method for producing such a multi-layered windowpane.

14 Claims, 2 Drawing Sheets

(52) U.S. Cl.
CPC .. *B32B 17/10779* (2013.01); *B32B 17/10788* (2013.01); *B32B 17/10816* (2013.01); *B60J 1/001* (2013.01); *B60J 1/08* (2013.01); *B32B 2255/00* (2013.01); *B32B 2274/00* (2013.01); *B32B 2307/412* (2013.01); *B32B 2307/732* (2013.01)

(58) Field of Classification Search
CPC ...... E06B 3/67; E06B 3/6715; E06B 3/66304; Y02B 80/22; Y02A 30/249; B32B 17/10055
See application file for complete search history.

(56) References Cited

U.S. PATENT DOCUMENTS

| | | | | |
|---|---|---|---|---|
| 6,429,961 | B1 * | 8/2002 | Harary | E06B 9/24 |
| | | | | 52/204.67 |
| 6,486,928 | B1 * | 11/2002 | Lin | B32B 17/10504 |
| | | | | 349/122 |
| 6,800,355 | B2 | 10/2004 | Wong | |
| 8,221,857 | B2 | 7/2012 | Jaeger | |
| 9,074,416 | B1 | 7/2015 | Nea | |
| 10,017,981 | B2 | 7/2018 | Hasegawa et al. | |
| 2002/0075552 | A1 * | 6/2002 | Poll | G02F 1/161 |
| | | | | 359/275 |
| 2006/0154005 | A1 | 7/2006 | Misonou et al. | |
| 2007/0082124 | A1 * | 4/2007 | Hartig | C03C 17/3644 |
| | | | | 427/109 |
| 2007/0281170 | A1 * | 12/2007 | Seth | E06B 3/6715 |
| | | | | 428/432 |
| 2009/0046355 | A1 | 2/2009 | Derda | |
| 2009/0255570 | A1 * | 10/2009 | Grommesh | H01L 31/0488 |
| | | | | 136/243 |
| 2009/0320921 | A1 * | 12/2009 | Grommesh | H10F 71/107 |
| | | | | 136/256 |
| 2010/0107525 | A1 * | 5/2010 | Grzybowski | C03B 23/0086 |
| | | | | 52/204.591 |
| 2011/0296771 | A1 | 12/2011 | Miller et al. | |
| 2011/0303287 | A1 * | 12/2011 | Lee | B32B 17/10302 |
| | | | | 136/259 |
| 2012/0027923 | A1 * | 2/2012 | Burgard | B32B 17/10302 |
| | | | | 427/74 |
| 2015/0116638 | A1 * | 4/2015 | Zhang | G02F 1/13452 |
| | | | | 349/86 |
| 2015/0138489 | A1 * | 5/2015 | Relot | G02F 1/1339 |
| | | | | 156/146 |
| 2016/0082812 | A1 * | 3/2016 | Okuda | B32B 17/10302 |
| | | | | 49/323 |
| 2017/0028686 | A1 * | 2/2017 | Wilson | B32B 7/05 |
| 2017/0114588 | A1 * | 4/2017 | Fukuda | C03C 17/3681 |
| 2018/0079181 | A1 * | 3/2018 | Gastal | B32B 17/1077 |
| 2018/0328102 | A1 * | 11/2018 | Byker | B32B 17/10798 |
| 2019/0227357 | A1 * | 7/2019 | Williams | G02F 1/1347 |
| 2019/0270284 | A1 * | 9/2019 | Couillard | B32B 17/10174 |
| 2020/0040570 | A1 | 2/2020 | Cook et al. | |
| 2020/0201113 | A1 * | 6/2020 | Baierl | G02F 1/1333 |
| 2020/0254730 | A1 * | 8/2020 | Schlögl | B32B 3/266 |
| 2020/0263485 | A1 * | 8/2020 | Kattmann | B32B 3/30 |
| 2020/0338864 | A1 * | 10/2020 | Van Der Meulen | |
| | | | | B32B 17/10779 |
| 2020/0400997 | A1 * | 12/2020 | Schulz | B32B 17/10036 |
| 2021/0016640 | A1 * | 1/2021 | Manz | B32B 17/10761 |
| 2021/0054682 | A1 * | 2/2021 | Ben Trad | E06B 3/6612 |
| 2021/0103174 | A1 * | 4/2021 | Ishii | B32B 3/085 |
| 2021/0123292 | A1 * | 4/2021 | Rietz | B32B 17/10761 |
| 2021/0301588 | A1 * | 9/2021 | Molbo | E06B 3/6775 |
| 2021/0396072 | A1 * | 12/2021 | Hasegawa | B32B 17/10036 |
| 2022/0105710 | A1 * | 4/2022 | Ishii | B32B 17/10504 |
| 2022/0152993 | A1 * | 5/2022 | Hasegawa | E06B 3/6612 |
| 2022/0250359 | A1 * | 8/2022 | Gima | B32B 17/10293 |
| 2022/0402244 | A1 * | 12/2022 | Mathy | B32B 17/10137 |
| 2023/0015338 | A1 * | 1/2023 | De Rycke | C03C 8/14 |
| 2024/0009970 | A1 * | 1/2024 | Maillaud | B32B 17/10651 |

FOREIGN PATENT DOCUMENTS

| | | | | |
|---|---|---|---|---|
| CN | 108116435 | A | 6/2018 | |
| DE | 2645259 | A1 | 4/1978 | |
| EP | 2363284 | A1 * | 9/2011 | ........ B32B 17/10091 |
| EP | 2642061 | A2 * | 9/2013 | ............ B61D 25/00 |
| JP | 2004323317 | A | 11/2004 | |
| JP | 2010513197 | A | 4/2010 | |
| JP | 2011189590 | A | 9/2011 | |
| JP | 2017128456 | A | 7/2017 | |
| JP | 2017149591 | A * | 8/2017 | |
| JP | 2018188341 | A | 11/2018 | |
| SE | 423427 | B * | 5/1982 | ....... B32B 17/10302 |
| WO | 2004016563 | A1 | 2/2004 | |
| WO | 2012157520 | A1 | 11/2012 | |
| WO | 2012157616 | A1 | 11/2012 | |
| WO | 2013132869 | A1 | 9/2013 | |
| WO | 2017056421 | A1 | 4/2017 | |
| WO | WO-2018233990 | A1 * | 12/2018 | ....... B32B 17/10036 |
| WO | 2019219593 | A1 | 11/2019 | |
| WO | WO-2020003252 | A1 * | 1/2020 | ....... B32B 17/10045 |

OTHER PUBLICATIONS

Machine translation of EP 2363284 A1.*
Machine translation of EP 2642061 A2.*
Machine translation of SE 423427 B.*

* cited by examiner

MULTI-LAYERED WINDOWPANE AND METHOD FOR PRODUCING SUCH WINDOWPANE

CROSS-REFERENCE TO RELATED APPLICATIONS

This application is the United States national phase of International Application No. PCT/NL2021/050090 filed Feb. 11, 2021, and claims priority to The Netherlands Patent Application No. 1043567 filed Feb. 13, 2020, the disclosures of which are hereby incorporated by reference in their entirety.

BACKGROUND OF THE INVENTION

Field of the Invention

The present invention relates to a multi-layered windowpane comprising a first transparent outer layer, a second outer layer and a, thinner and smaller, third inner transparent layer. The invention also relates to a thin layered windowpane core to be incorporated in a multi-layered windowpane as well as to a method for producing a multi-layered windowpane.

Description of Related Art

Multi-layered windowpanes are used for their strength, temperature insulating capacities and/or acoustic insulating capacities. Vacuum insulating glazing is also provided with an evacuated space between two glass layers as the vacuum reduces the temperature and/or vibration transfer between the glass layers due to less or no conduction and convection. Furthermore radiative heat transfer may be reduced to a low level by incorporating at least one internal transparent low emittance or other infrared reflective coating.

Durable glazing units are, among others, known from US 2017/0028686 wherein a glass unit is disclosed having a first pane outboard sheet, an inboard sheet, and an interlayer there between, wherein the inboard sheet is smaller than the outboard sheet; and a second pane spaced away from and sealed to the first pane. Also a gas space between the first pane and the second pane is provided as well as a spacer located between the first pane and the second pane, which spacer is adhered to the first pane and to the second pane with a primary seal; and a second seal that adheres the first pane to the second pane.

SUMMARY OF THE INVENTION

Such multi-layered windowpanes are providing strength and good insulating values but they have a relative heigh weight which is not an issue for window glass in buildings. However multi-layered windowpanes for automotive application have an additional requirement. Besides the requirements of high scores on strength, temperature insulating capacities and acoustic insulating capacities, in automotive application the requirement is also that they have a limited weight. This is even more urgent with the electrification of cars and buses by the use of batteries, and the need to limit the energy consumption of climate controls that uses battery capacity. There is thus a growing demand in energy saving windowpanes and the available insulated windowpanes are not suited to be used on varying altitudes, like for vehicles driving up and down mountain roads. The object of the present invention is to provide a multi-layered windowpane meeting such demands as well a method for producing such multi-layered windowpane.

The present invention provides a multi-layered windowpane comprising: a first transparent outer layer, a second transparent outer layer, and a third, smaller, transparent inner layer that is located in between the outer layers such that the outer transparent layers from all sides protrude from the third inner layer, an adhesive transparent foil layer located between the first outer layer and the third inner layer that over the entire surface of the third inner layer connects the third inner layer with the first outer layer; a sealing surrounding the third inner layer and gastight connecting the outline borders of the outer layers; wherein the thickness of each of the outer layers is at least two times, preferably at least three times, the thickness of the third inner layer, and wherein the multi-layered windowpane further comprises spacers distributed over the entire surface of the side of the third inner layer facing towards the second outer layer. In such multi-layered windowpane the thin, or ultra-thin, inner layer is completely protected by the relative more robust outer layers and the surrounding sealing and thus results in a reduced vulnerability. The third inner layer contributes substantially to the insulating properties of the multi-layered windowpane while it hardly contributes to a higher weight of the construction. The adhesive transparent foil layer attaching the third inner layer over its entire surface to first outer layer also provides a construction that is able to handle relative high temperature differences between the panels (resulting from the temperature insulating properties of the multi-layered windowpane) with the resulting differences in expansion of the glass panels with different thicknesses. Also the sealing surrounding the (thinner) third inner layer provides some space to compensate for the difference in the expansion of the outer layers with respect to the inner layer. As the temperature differences over the multi-layered window-pane may be substantial (due to the high thermal insulating properties of the window pane according to the invention) and the expansion of the layers with various thicknesses may also be relatively substantial the present window-pane is designed to cope such expansion differences.

Furthermore the spacers are distributed over, and thus contacting at spread locations, the entire surface of the side of the third inner layer. This leads to a well distributed internal support of the construction an prevents unmanageable peak loads on the surface of the third inner layer; also this feature contributes to a compact and robust construction. As for compactness; a further advantage is that the heigh strength and heigh insulation value enables to use of—in total—less thick multi-layered windowpanes which is especially advantageous in automotive applications of the a multi-layered windowpane according to the invention. As will be explained later the multi-layered windowpane according to the invention also enables a relative simple production method. The adhesive transparent foil layer may also be supportive to provide a splinter safety construction, in case of crushing of an outer and/or inner layer contacting the foil layer will hold any (or at least most) of the resulting splinters.

Preferably the sealing not directly contacts the outline border of the first outer layer but with the adhesive transparent foil layer in between the sealing and the border of the first outer layer, so that the sealing and the adhesive transparent foil layer merge/fuse. This further enhances the quality of the sealing of the multi-layered windowpane.

In the wording of the claims with "the outline borders of the outer layers" reference is made to the peripheral edges of the outer layers. Furthermore the word "layer" may also be read as "sheet", and "transparent" must be considered as being permeable for at least most of an optical radiation (ultraviolet, the visible spectrum and/or infrared). In relation to the spacers is noted that they may be attached to the surface of the third inner layer but they may also be attached to the surface of a layer that is adjacent (contacting) this side of the third inner layer, like for instance (the inner side of) the second outer layer. As some thermoplastic elastomers do not cross-link, cross linking may also be interpreted as fully laminated.

The invention also provides such a multi-layered windowpane that further comprises a fourth, thinner and smaller, transparent inner layer located in between the third inner layer and the second outer layer, and a second transparent adhesive foil layer located between the fourth inner layer and the second outer layer that over the entire surface of the fourth inner layer connects the fourth inner layer with the second outer layer; wherein the thickness of each of the outer layers is at least two times, preferably three times, the thickness of each of the inner layers, wherein the outer layers from all sides protrude from the inner layers, and wherein the sealing surrounds both the inner layers and gastight connects the outline borders of the outer layers. Now the single (third) inner layer is doubled by adding another (fourth) inner layer as well as by adding a second transparent adhesive foil layer for adhering the additional (fourth) inner layer over its entire surface to the second outer layer. In this alternative multi-layered windowpane according to the invention a double internal layer package (with spacers in between the two (third and fourth) inner layers) is fully encapsulated in two transparent adhesive foil layer and the inner layers surrounding sealing. Preferably here the sealing contacts a part of both adhesive transparent foil layers protruding around the circumference of the inner layers so that the sealing and both the adhesive transparent foil layers may merge/fuse during the production process. This again adds to the quality of the sealing of the multi-layered windowpane. This construction with dual inner layers is well suited to absorb stresses due to expansion and is well insulated as the "core" of the multi-layered windowpane is fully encapsulated by the dual adhesive transparent foil layers and the sealing. A further advantage is that such "core" of the dual inner layers, the two foil layers and the sealing may be produced as a semi-finished product that is embedded between two outer layers on a later time and/or other location thus providing substantial additional logistical possibilities. This "core" of the dual inner layers without the outer layers is also part of the invention as will be explained later. Yet a further advantage is that the double adhesive transparent foil layers are now supportive to provide a splinter safety construction as they will hold any splinters resulting from the two outer layers and the two inner layers. As for the size of the fourth, smaller, transparent inner layer this "smaller size" relates the two outer layers, the outer transparent layers preferably also protrude from all sides from the fourth inner layer. In relation to the size of the third inner layer the size of the fourth inner layer may be comparable or identical. In relation to the thickness of each of the outer layers in practise (and preferably) this thickness is more than two times the thickness of each of the inner layers.

In the multi-layered windowpane according to the invention the spacers may provide a free space adjacent the third inner layer, which free space is gastight separated from the outside air. The spacers are thus spacing apart the third inner layer from the second outer layer, or alternatively, if present in the layer stack, spacing apart the third inner layer from the fourth inner layer. In the free space around the spacers the pressure may be low, meaning lower than the open air pressure, or even less than 0.01 bar, preferably less than $1 \times 10^{-5}$ bar. This free space, preferably with low or ultra-low pressure, enhances the insulating properties of the multi-layered windowpane. To maintain such low pressure in the free space and/or to prevent pollution to enter the free space the free space is gastight separated from the outside air by the sealing, possibly in combination with the foil layer(s) fused with the seal. multi-layered windowpane with a low pressure in the free space is also referred to as "vacuum insulated glass" (VIG).

The transparent foil layer(s) and/or the sealing may be made of a thermoplastic elastomer, for instance an adhesive co-polymer like Poly Vinyl Butyral (PVB), Ethylene-Vinyl Acetate (EVA) or Thermoplastic Polyurethane (TPU). The advantage of such thermoplastic elastomer is that they are simple to use in the production process and irreversible bond at a certain temperature whether or not also by cross-linking; providing irreversible sealing properties.

The multi-layered windowpane according to the invention may be flat but the multi-layered windowpane may also have a curved shape. Especially in automotive multi-layered windowpane applications with various shapes occur, think for instance of complex shaped car windows.

In an embodiment the at least one inner layer has a thickness of less than 2.1 mm, but preferably the thickness of the inner layer(s) is less than 1 mm, even more preferably within the range of 0.3-0.7 mm. Due to the solidity of the first and second external layers (with a thickness of at least twice—but preferably at least three times—the thickness of the inner layer(s)) the inner layers may be exceptionally thin). The possibly occurring differences in expansion are captured by the construction of the multi-layered windowpane according to the invention incorporating a sealing and adhesive transparent foil layer(s). For solidity the out layers have a thickness of at least, but preferably more than, 1 mm.

The spacers may be attached to the third inner layer, to the second outer layer (in case only a single inner layers is used) and/or to the fourth inner layer (in case two inner layers are used). In an embodiment the spacers are printed on at least one layer but the spacers may also be embodied as glass elements attached to at least one layer. The window pane layers may traditionally be made of glass and/or reinforced glass but as an alternative also other transparent materials may be use for one or more of the layers, for instance a plastic material.

The present invention also provides a thin layered windowpane core to be incorporated in a multi-layered windowpane according to the present invention comprising: at least two stacked transparent inner layers; spacers, spacing apart the two inner layers providing a free space between the two stacked inner layers; a sealing surrounding the stacked inner layers leaving a gas-permeable connection to the outside air; and two transparent foil layers, which transparent foil layers cover the outside both the inner layers and both at least partially also cover the sealing, wherein the inner layers, spacers, sealing and foil layers are mechanically joined with a gas-permeable connection of the free space between the two stacked inner layers to the outside air.

In line with the multi-layered windowpane according the present invention wherein such window pane core is to be embedded at least one inner layer has a thickness of less than 2.1 mm, but preferably the thickness of the inner layer(s) is less than 1 mm, even more preferably within the range of 0.3-0.7 mm. The two inner layers may traditionally be made of glass and/or reinforced glass. Such thin layered windowpane core may be produced at a different location and time than when the multi-layered windowpane according to the present invention may be produced; this provides considerable logistical advantages.

The surrounding sealing and/or at least one of the transparent foil layers may be made of a thermoplastic elastomer which is in a pre-bonded not complete crosslinked or non-crosslinked state. Furthermore the surrounding sealing and/or the transparent foil layer may have a pre-bonded profiled surface. In the pre-bonded condition the thermoplastic is preferably not cross-linked (or at least not fully cross-linked) yet so that in the final production of the multi-layered windowpane according to the invention the bonding characteristics of the surrounding sealing and/or at least one of the transparent foil layers may be used for the assembly of the final product. This may for instance be realised by pre-heating the thermoplastic elastomer to for instance 50° C. (or 30-70° C.) providing some mechanical strength for relative positioning of the sealing, foil layers and third and fourth inner layers (the final bonding whether or not with cross-linking typically takes place at a higher temperature level of 90° C.-130° C.). It is however important to maintain a gas-permeable connection of the free space between the two stacked inner layers to the outside air (thus the sealing may not gas tight seal the free space in this stage yet) to enable deaeration of the free space during the production of the final multi-layered panel according to the invention. The advantage is that the thin layered windowpane core as semi-product is less vulnerable before the final production and it leaves a choice to which pressure (and possibly also with which filling gas) the free space between the inner glass layers is to be closed.

To enhance gas exchange with the free space between the inner layer during the final production step of the multi-layered panel the surrounding sealing and/or the transparent foil layer may have a pre-bonded profiled surface. Such profiled surface may facilitate an easier gas exchange with the free space between the inner layers during the production of the final multi-layered panel. To provide a mechanical coherence to the thin layered windowpane core the sealing and/or the transparent foil layers may be spot welded.

The present invention also provides a method for producing a multi-layered windowpane according to the invention, wherein the stacked two outer layers, at least one inner layer, the spacers, at least one intermediate transparent foil layer and the sealing are united by heating and exerting a pressure on the stack;

wherein a free space provided by the spacers adjacent the third inner layer is brought to low gas pressure and subsequently gastight separated from the outside air; and wherein the pressure attaching at least one inner layer with an intermediate foil layer onto a corresponding outer layer, for as long as the intermediate foil layer is not hardened, is kept below the level of the pressure difference of the environmental pressure level with the low pressure level in the free space. With this method the optical distortion due to deformation of the multi-layered windowpane may be reduced. After a multi-layered windowpane according to the invention has been produced a constant force due to atmospheric pressure pushes through the outer and inner layer(s) on the spacers. This force may cause the layers to locally bend around the spacers and forming spherical shapes in one or more of the layers. Such deformations ("wobbles") give optical distortion as well as loss in mechanical strength of the multi-layered windowpane due to permanent internal stresses. The present multi-layered construction of the windowpane will provide additional strength and thus reduces this unwanted deformations. However during production of the multi-layered windowpane according to the invention the at least one foil layer may be deformed as this layer (these layers) will be viscous or liquid during the heating in the production process and due to local peak pressure loads there where the spacers are located the viscous/liquid foil layer material will locally partially flow away until the pressure difference in the foil layer is more or less leveled out. This will result in deformations in the finished foil layer(s) causing stronger optical distortion. The solution according to the present invention is to reduce the pressure on the spacers when viscosity of the foil layer(s) is lower, that is when the foil layer is heated but not cross-linked yet. Thus; after the foil layer material is connecting at least one inner and outer layer and is at least partially hardened, the atmospheric pressure will press for the first time on the spacers in the multi-layered windowpane according to the invention.

Thus; after cooling down—and or after cross linking—of the foil layer material, the thicker outer layer, the foil material and the thinner inner layer, together form one more solid element and gives a significantly higher strength than the individual material layers and a more homogeneous thickness of all the layers will be remained.

In a specific embodiment of the method according to the invention the method comprises the subsequent method steps: a) attaching by heating at least an inner layer with an intermediate transparent foil layer to an outer layer until the intermediate foil layer is at least partially cross-linked; b) stacking the pre-processed inner layer/intermediate foil/outer layer partial stack with a least one additional outer layer and a sealing, c) placing the stack resulting from method step b) in a low-pressure environment while heating the stack and exerting pressure on the stack during which process step gas is exerted from the free space; and d) gas-tight closing off the free space with the sealing and uniting all the layers of the multi-layered windowpane. In a specific embodiment of this method, during processing step a) two inner layers, each with an intermediate transparent foil layer may be attached to a corresponding outer layer until both the intermediate foil layers are least partially cross-linked, and during processing step b) both the pre-processed inner layer/intermediate foil/outer layer partial stacks may be stacked with an intermediate sealing. In these methods first a one or two solid combinations of an outer layer, foil layer and inner layer are produced before the final multi-layered stack of the complete windowpane is made. The foil layer material may thus be hardened before the final product is to be produced.

As an alternative the method according to the invention comprises the subsequent method steps of e) placing the stacked two outer layers, at least one inner layer, the spacers, at least one intermediate transparent foil layer and the sealing are placed in an low pressure environment thus bringing the free space onto the low pressure level, f) gas-tight closing off the free space; g) enhancing the external pressure on the stacked package to an intermediate pressure level between the low pressure level used in method step e) and the environmental pressure and heating the stacked package until the stacked package is united and the at least one foil layer is hardened; and h) enhancing the pressure on the united stack to environmental pressure level. For instance the low pressure level may be in the range of [0-0.1] bar (to provide a near vacuum in the free space) and the intermediate pressure level may be in the range of [0.15-0.7] bar. In these alternative methods the pressure for uniting all the layers of the multi-layered windowpane is kept at a lower level until the foil material is at least partially hardened. Also with these methods the deformation of the viscous or liquid (=soft) foil material is prevented or at least limited.

In yet a further embodiment of the methods wherein the pressure for uniting all the layers of the multi-layered windowpane is kept at a lower level until the foil material is at least partially hardened before stacking the outer and inner layers, the sealing and at least one transparent foil layer according to method step f) a thin layered windowpane core according to the present invention is made (earlier) as a semi-finished product, which thin layered windowpane core in method step f) is incorporated as a part of the outer and inner layers, the sealing and at least one transparent foil layer to be stacked. As mentioned before producing a windowpane core as a semi-finished product provides substantial logistical advantages. To provide some unity in such thin layered windowpane core the windowpane core may heated to a temperature <65° C., preferably <55° C., before the thin layered windowpane core in method step f) may be incorporated as a part of the outer and inner layers, the sealing and at least one transparent foil layer to be stacked. This for instance provides the option to produce the thin layered windowpane core as a semi-finished product at a different location then where the subsequent method steps f)-h) take place.

The spacers will normally be attached to a layer (preferably an inner layer) before the layers are stacked, but as an alternative the spacers may also be located after partial stacking of some of the layers.

In a specific embodiment of the method at least part of the production process takes place in an autoclave. An autoclave is a device used to carry out industrial processes requiring higher of lower temperature and pressure in relation to ambient pressure/temperature. The heating of—and exerting pressure on—the stacked two outer layers, at least one inner layer, the spacers, at least one intermediate transparent foil layer and the sealing to unite the stack and to provide an underpressure in the free space may be realised in an autoclave wherein the stacked material is placed in a gas impermeable sack which sack is connected to a gas extractor. By extracting gas from the sack (and allowing gas/air to enter the sack again) the pressure on the stack may well controlled varied.

BRIEF DESCRIPTION OF THE DRAWINGS

The present invention will be further elucidated on the basis of the non-limitative exemplary embodiments shown in the following figures. Herein shows.

DESCRIPTION OF THE INVENTION

Figure 1A:
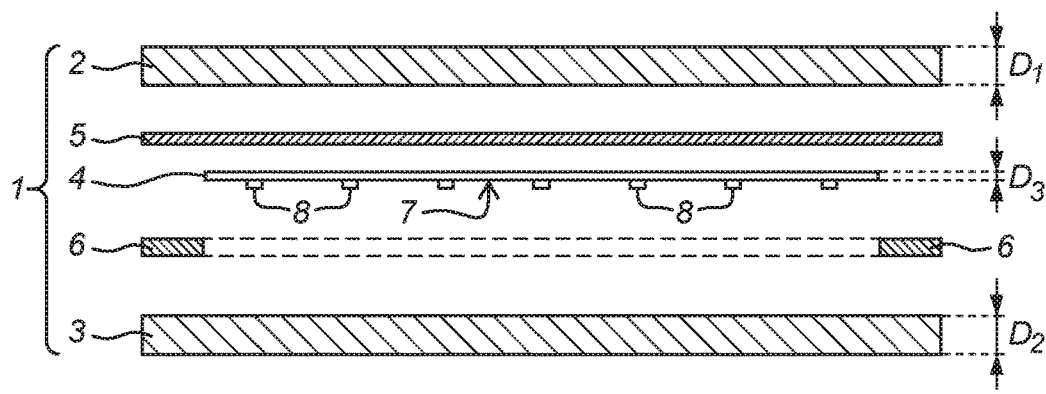
FIG. 1A a cross section of the components of a multi-layered windowpane according of the invention with a single inner layer before assembly.

FIG. 1A shows a cross section of the individualised components of a multi-layered windowpane 1 according of the invention having a first transparent outer layer 2, a second transparent outer layer 3, and a third, smaller, transparent inner layer 4 that is located in between the outer layers 2, 3. Also visible is that the outer layers 2, 3 protrude from all sides from the third inner layer 4. Between the first outer layer 2 and the third inner layer 4 an adhesive transparent foil layer 5 is provided. A sealing 6 surrounds the third inner layer 4. The thickness $D_1$, $D_2$ of the outer layers 2, 3 is more than twice the thickness $D_3$ of the third inner layer 4. Over the entire surface 7 of the third inner layer 4 spacers 8 are distributed that facing towards the second outer layer 3. In FIG. 1A the components are not unified yet.

Figure 1B:
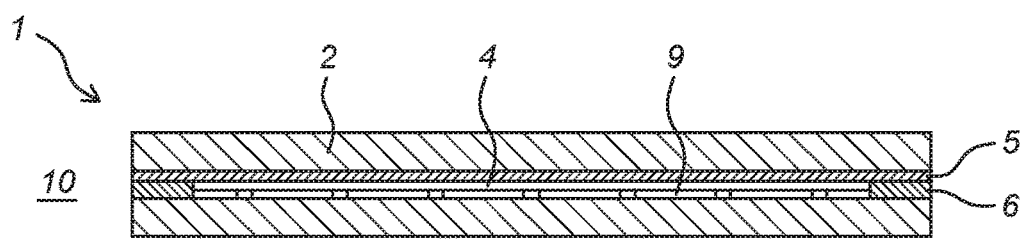
FIG. 1B a cross section of the components of a multi-layered windowpane according to FIG. 1A after assembly.

In FIG. 1B the components as shown in FIG. 1A are now assembled (unified) to a multi-layered windowpane 1 according of the invention. The adhesive transparent foil layer 5 connect the third inner layer 4 with the first outer layer 2 and the sealing 6 connects the outer layers 2, 3 (together with the adhesive transparent foil layer 5). The sealing 6 here is even merged with the foil layer 5. Around the spacers 8 there is free space 9 that is gas-tight sealed off from the environment 10 by the sealing 6 and the foil layer 5. In this free space 9 the gas pressure is preferably lower than the air pressure in the environment (more preferably close to vacuum).

Figure 2A:
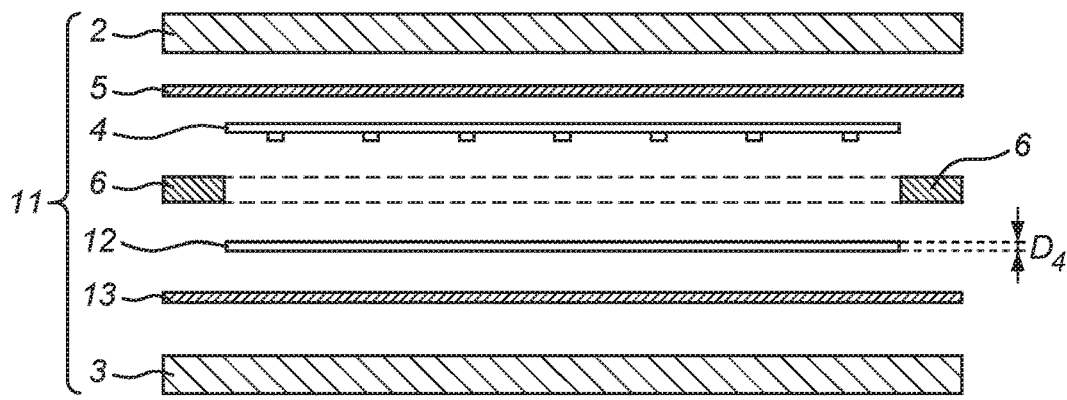
FIG. 2A a cross section of the components of an alternative embodiment of the multi-layered windowpane according of the invention with two inners layer before assembly.

FIG. 2A shows a cross section of the components of an alternative embodiment of a multi-layered windowpane 11 before assembly wherein the components that correspond with the identical components of the multi-layered windowpane 1 as shown in FIGS. 1A and 1B have identical reference signs. Compared to the windowpane 1 from FIGS. 1A, 1B the multi-layered windowpane 11 has two inners layers 5, 12; a third inner layer 5 (as demonstrated before) and an additional fourth inner layer 12. Between the fourth inner layer 12 and the second outer layer 3 an additional transparent adhesive foil layer 13 is positioned. Also the fourth inner layer 12 is smaller than the outer layers 2, 3. The thickness $D_4$ of the fourth inner layer 14 is less than half the thickness $D_1$, $D_2$ of the outer layers 2, 3 and is more less the same as the thickness $D_3$ of the third inner layer 4.

Figure 2B:
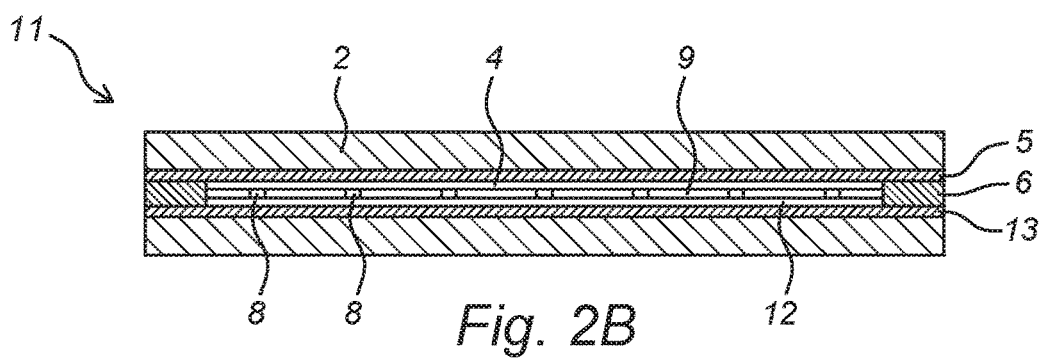
FIG. 2B a cross section of the components of a multi-layered windowpane according to FIG. 1B after assembly.

In FIG. 2B the components as shown in FIG. 2A are now assembled (unified) to a multi-layered windowpane 1 according of the invention. The adhesive transparent foil layer 13 connects the fourth inner layer 12 with the second outer layer 3 and the sealing 6 connects the outer layers 2, 3 (together with the adhesive transparent foil layers 5, 13). Also here the sealing 6 may be merged with both the foil layer 5, 12. The free space 9 around the spacers 8 is now located between the two inner layers 5, 12 and is also gas-tight sealed off from the environment 10 by the sealing 6 and the foil layers 5, 12.

Figure 3:
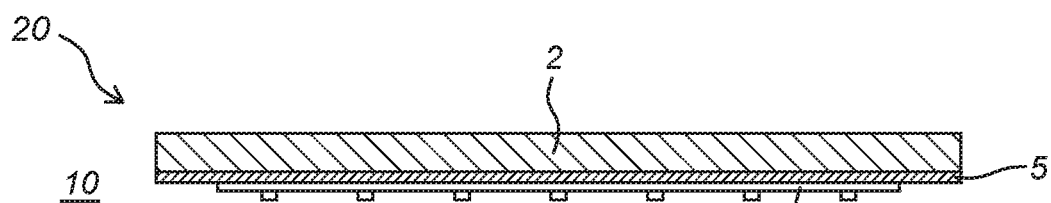
FIG. 3 a cross section of an assembled out layer, foil layer and inner layer with spacers.

FIG. 3 shows a cross section of an assembled out layer 2, foil layer 5 and inner layer 4 with spacers 8 which elements are already unified as a semi-finished product 20. The foil layer 5 is preferably irreversible hardened (cross-linked) so that when heated again it will not loose its solidity. Using such a semi-finished product 20 in the production of a multi-layered windowpane 1, 11 according to the invention limits the chance of deformations in the finished windowpane foil layer(s) 5, 13 causing optical distortion.

Figure 4:
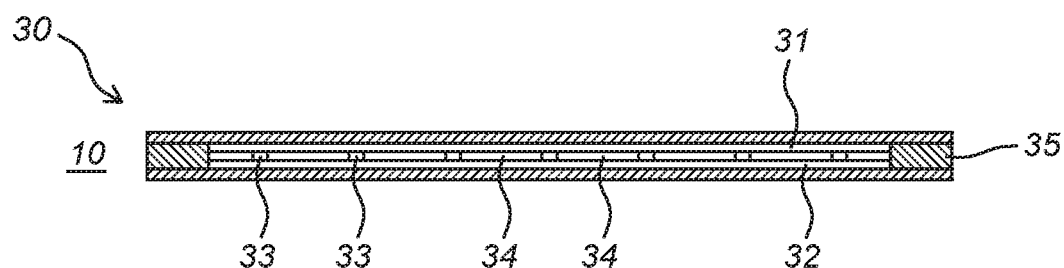
FIG. 4 a cross section of a thin layered windowpane core according to the invention after assembly.

FIG. 4 shows a cross section of a thin layered windowpane core 30 according to the invention after assembly as a semi-finished product to be incorporated in a multi-layered windowpane 1, 11 according to the invention. The windowpane core 30 has two stacked transparent inner layers 31, 32, spacers 33 spacing apart the two inner layers 31, 32 and providing a free space 34 between the inner layers 31, 32. A sealing 35 surrounds the inner layers 31, 32 (and not visible: leaving a gas-permeable connection to the outside air). Two transparent foil layers 36, 37 cover the outside of the inner layers 31, 32 and both also cover the sealing 35 but the transparent foil layers 36, 37 are not fully merged with the sealing 35 as there remains a gas-permeable connection of the free space 34 between the two stacked inner layers 31, 32 to the outside air 10.

Figure 5:
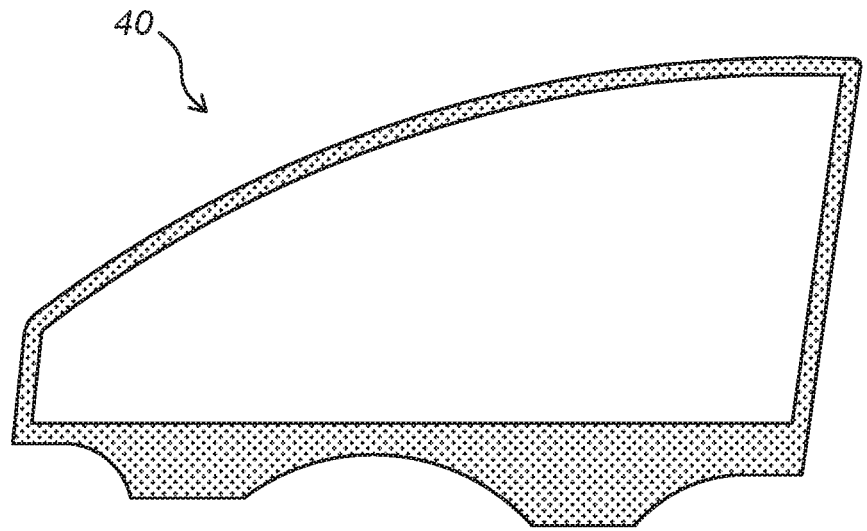
FIG. 5 a side view on a car-windowpane according to the invention.

FIG. 5 shows a side view on a car-windowpane 40 according to the invention that has a three dimensional shape.

The invention claimed is:

1. A multi-layered windowpane comprising:
   a first transparent outer layer,
   a second transparent outer layer, and
   a third, smaller, transparent inner layer that is located in between the outer layers such that the outer layers have respective peripheries that are greater than and extend beyond a periphery of the third transparent inner layer,
   a first adhesive transparent foil layer located between the first outer layer and the third inner layer and over an entire surface of the third inner layer such that the first adhesive transparent foil layer connects the third inner layer with the first outer layer;
   a fourth, thinner and smaller, transparent inner layer located in between the third inner layer and the second outer layer, such that the outer layers have respective peripheries that are greater than and extend beyond a periphery of the fourth transparent inner layer and;
   a second adhesive transparent foil layer located between the fourth inner layer and the second outer layer and over the entire surface of the fourth inner layer such that the second adhesive transparent foil layer connects the fourth inner layer with the second outer layer;
   a sealing surrounding both of the inner layers and gastight connecting outline borders of the outer layers;
   wherein a thickness of each of the outer layers is at least two times a thickness of each of the inner layers,
   wherein the multi-layered windowpane further comprises spacers distributed over a surface of the third inner layer facing towards the second outer layer, wherein the spacers are located in a free space adjacent the third inner layer, and wherein the free space is gastight separated from an outside air external to the multi-layered windowpane,
   wherein the first adhesive transparent foil layer covers an outside surface of the third inner layer,
   wherein the second adhesive transparent foil layer covers an outside surface of the fourth inner layer, and
   wherein the transparent adhesive foil layers both cover at least part of the sealing at a side of the sealing facing towards the respective outer layer.

2. The multi-layered windowpane according to claim 1, wherein at least one transparent foil layer and/or the sealing is made of a thermoplastic elastomer.

3. The multi-layered windowpane according to claim 1, wherein the multi-layered windowpane has a curved shape.

4. The multi-layered windowpane according to claim 1, wherein at least one inner layer has a thickness of less than 2.1 mm.

5. The multi-layered windowpane according to claim 1, wherein the spacers are printed on a layer.

6. The multi-layered windowpane according to claim 1, wherein the spacers are glass elements attached to a layer.

7. The multi-layered windowpane according to claim 1, wherein at least one of the layers is made of glass, reinforced glass, or plastic.

8. A method for producing a multi-layered windowpane according to claim 1, wherein the two outer layers, at least one inner layer, the spacers, at least one adhesive transparent foil layer and the sealing are arranged to form a stack, wherein the stack is united by heating and application of a pressure;
   wherein a free space is brought to low gas pressure and subsequently gastight separated from the outside air; and
   wherein the pressure on the stack, for as long as the adhesive transparent foil layer is not hardened, is kept below the level of the pressure difference of an environmental pressure level with the low pressure level in the free space.

9. The method according to claim 8, comprising the subsequent method steps:
   a) attaching by heating at least an inner layer with an adhesive transparent foil layer to one of said outer layers until the adhesive transparent foil layer is at least partially cross-linked;
   b) stacking a partial stack comprising the inner layer/adhesive transparent foil layer/outer layer of step a) with a least one additional outer layer and a sealing to form a processed partial stack,
   c) placing the processed partial stack resulting from method step b) in a low-pressure environment while heating the processed partial stack and exerting pressure on the processed partial stack during which process step gas is exerted from the free space; and
   d) gas-tight closing off the free space with the sealing and uniting all the layers of the multi-layered windowpane.

10. The method according to claim 9, wherein during processing step a) two inner layers, each with a respective adhesive transparent foil layer are attached to a corresponding outer layer until both the adhesive transparent foil layers are at least partially cross-linked, and
   wherein during processing step b) both the inner layer/adhesive transparent foil layer/outer layer partial stacks are stacked with an intermediate sealing.

11. The method according to claim 9, comprising the subsequent method steps:
   e) placing the stacked two outer layers, at least one inner layer, the spacers, at least one adhesive transparent foil layer and the sealing in an low pressure environment thus bringing the free space onto the low pressure level,
   f) gas-tight closing off the free space;
   g) increasing the pressure on the stack to an intermediate pressure level between the low pressure level used in method step e) and the environmental pressure and heating the stack until the stack is united and the at least one foil layer is hardened; and
   h) increasing the pressure on the united stack to environmental pressure level.

12. The method according to claim 11, wherein before stacking the outer and inner layers, the sealing and at least one adhesive transparent foil layer according to method step e), a thin layered windowpane core is incorporated as a part of the outer and inner layers, the sealing and at least one adhesive transparent foil layer to be stacked, wherein the windowpane core comprises two inner layers, the spacers, the sealing, and two adhesive transparent foil layers.

13. The method according to claim 12, wherein the thin layered windowpane core is heated to a temperature<65° C. before the thin layered windowpane core is incorporated as a part of the outer and inner layers, the sealing and at least one transparent foil layer to be stacked.

14. The method according to claim 12, wherein the thin layered windowpane core as a semi-finished product is produced at a location different from where the subsequent method steps f)-h) take place.

* * * * *